(12) United States Patent
Sahni et al.

(10) Patent No.: US 10,027,420 B2
(45) Date of Patent: Jul. 17, 2018

(54) METHOD AND SYSTEM FOR A SILICON-BASED OPTICAL PHASE MODULATOR WITH HIGH MODAL OVERLAP

(71) Applicant: Luxtera, Inc., Carlsbad, CA (US)

(72) Inventors: Subal Sahni, La Jolla, CA (US); Kam-Yan Hon, Oceanside, CA (US); Attila Mekis, Carlsbad, CA (US); Gianlorenzo Masini, Carlsbad, CA (US); Lieven Verslegers, La Jolla, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 14/752,696

(22) Filed: Jun. 26, 2015

(65) Prior Publication Data
US 2015/0381283 A1 Dec. 31, 2015

Related U.S. Application Data

(60) Provisional application No. 61/998,386, filed on Jun. 26, 2014.

(51) Int. Cl.
*G02F 1/225* (2006.01)
*H04B 10/00* (2013.01)
(Continued)

(52) U.S. Cl.
CPC ........... *H04B 10/548* (2013.01); *G02F 1/025* (2013.01)

(58) Field of Classification Search
CPC .......... G02F 1/00; G02F 1/025; H04B 10/548
(Continued)

(56) References Cited

U.S. PATENT DOCUMENTS

| | | | |
|---|---|---|---|
| 4,933,021 A | * | 6/1990 | Swanson ........... H01L 31/03529 136/249 |
| 5,757,986 A | | 5/1998 | Crampton |

(Continued)

OTHER PUBLICATIONS

ZhiYong Li et al. Silicon waveguide modulator based on carrier depletion in periodically interleaved PN junctions; Aug. 2009, optics express;pp. 15947-15958.*

(Continued)

*Primary Examiner* — Amritbir Sandhu
(74) *Attorney, Agent, or Firm* — McAndrews, Held & Malloy

(57) ABSTRACT

Methods and systems for a silicon-based optical phase modulator with high modal overlap are disclosed and may include, in an optical modulator having a rib waveguide in which a cross-shaped depletion region separates four alternately doped sections: receiving an optical signal at one end of the optical modulator, modulating the received optical signal by applying a modulating voltage, and communicating a modulated optical signal out of an opposite end of the modulator. The modulator may be in a silicon photonically-enabled integrated circuit which may be in a complementary-metal oxide semiconductor (CMOS) die. An optical mode may be centered on the cross-shaped depletion region. The four alternately doped sections may include: a shallow depth p-region, a shallow depth n-region, a deep p-region, and a deep n-region. The shallow depth p-region may be electrically coupled to the deep p-region periodically along the length of the modulator.

29 Claims, 6 Drawing Sheets

(51) Int. Cl.
*H04B 10/548* (2013.01)
*G02F 1/025* (2006.01)

(58) Field of Classification Search
USPC ............. 398/182–190; 385/2, 3, 8, 129
See application file for complete search history.

(56) References Cited

U.S. PATENT DOCUMENTS

| | | | |
|---|---|---|---|
| 6,298,177 B1 | 10/2001 | House | |
| 7,136,544 B1* | 11/2006 | Gunn, III | G02B 6/12004 385/3 |
| 8,014,636 B2* | 9/2011 | Shubin | B82Y 20/00 257/21 |
| 8,923,664 B2* | 12/2014 | Mekis | G02B 6/43 385/12 |
| 9,331,096 B2* | 5/2016 | Pinguet | H01L 21/84 |
| 2005/0089257 A1* | 4/2005 | Barrios | G02F 1/025 385/2 |
| 2006/0008223 A1* | 1/2006 | Gunn, III | G02F 1/025 385/129 |
| 2007/0031080 A1* | 2/2007 | Liu | G02F 1/025 385/3 |
| 2010/0080504 A1* | 4/2010 | Shetrit | G02B 6/12004 385/14 |
| 2011/0217002 A1* | 9/2011 | Mekis | G02B 6/26 385/28 |
| 2012/0189239 A1* | 7/2012 | Tu | G02F 1/025 385/2 |
| 2015/0280832 A1* | 10/2015 | Fujikata | H04B 10/5561 398/25 |
| 2015/0316793 A1* | 11/2015 | Ayazi | G02F 1/025 385/3 |
| 2015/0316795 A1* | 11/2015 | Hui | G02F 1/025 385/2 |
| 2015/0381283 A1* | 12/2015 | Sahni | H04B 10/548 398/188 |
| 2017/0023810 A1* | 1/2017 | Ogawa | G02F 1/015 |
| 2017/0184883 A1* | 6/2017 | Sun | G02F 1/025 |
| 2018/0011347 A1* | 1/2018 | Ishikura | G02F 1/025 |

OTHER PUBLICATIONS

Li et al, Silicon waveguide modulator based on carrier depletion in periodically interleaved PN junctions, Aug. 2009 and OSA.*
Reed et al; Recent breakthroughs in carrier depletion based silicon optical modulators; Dec. 2013; Nanophotonics.*
Reed et al; Recent breakthroughs in carrier depletion based silicon optical modulators; 2014; Science Wise Publishing; 229-245.*
Yong et al; PN junctions for efficient silicon Mach-Zehnder and microring modulators in the O-band; Mar. 2017; Optics Express; pp. 8425-8439.*

* cited by examiner

METHOD AND SYSTEM FOR A SILICON-BASED OPTICAL PHASE MODULATOR WITH HIGH MODAL OVERLAP

CROSS-REFERENCE TO RELATED APPLICATIONS/INCORPORATION BY REFERENCE

This application claims priority to and the benefit of U.S. Provisional Application 61/998,386 filed on Jun. 26, 2014, which is hereby incorporated herein by reference in its entirety.

FIELD

Certain embodiments of the disclosure relate to semiconductor photonics. More specifically, certain embodiments of the disclosure relate to a method and system for a silicon-based optical phase modulator with high modal overlap.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a silicon-based optical phase modulator with high modal overlap, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a silicon-based optical phase modulator with high modal overlap. Exemplary aspects of the disclosure may comprise, in an optical modulator having a rib waveguide in which a cross-shaped depletion region separates four alternately doped sections: receiving an optical signal at one end of the optical modulator, modulating the received optical signal by applying a modulating voltage to the optical modulator, and communicating a modulated optical signal out of an opposite end of the optical modulator. The optical modulator may be in a silicon photonically-enabled integrated circuit. The silicon photonically-enabled integrated circuit may be in a complementary-metal oxide semiconductor (CMOS) die. An optical mode from the received optical signal may be centered on the cross-shaped depletion region. The four alternately doped sections may comprise: a shallow depth p-region, a shallow depth n-region, a deep p-region, and a deep n-region. The shallow depth p-region may be electrically coupled to the deep p-region periodically along the length of the optical modulator. The shallow depth n-region may be electrically coupled to the deep n-region periodically along the length of the optical modulator. A rib section of the rib waveguide may comprise the shallow depth p-region and the shallow depth n-region. A slab section of the rib waveguide may comprise the deep p-region and the deep n-region. Highly doped layers may be on top of the shallow depth p-region and the shallow depth n-region.

Figure 1A:
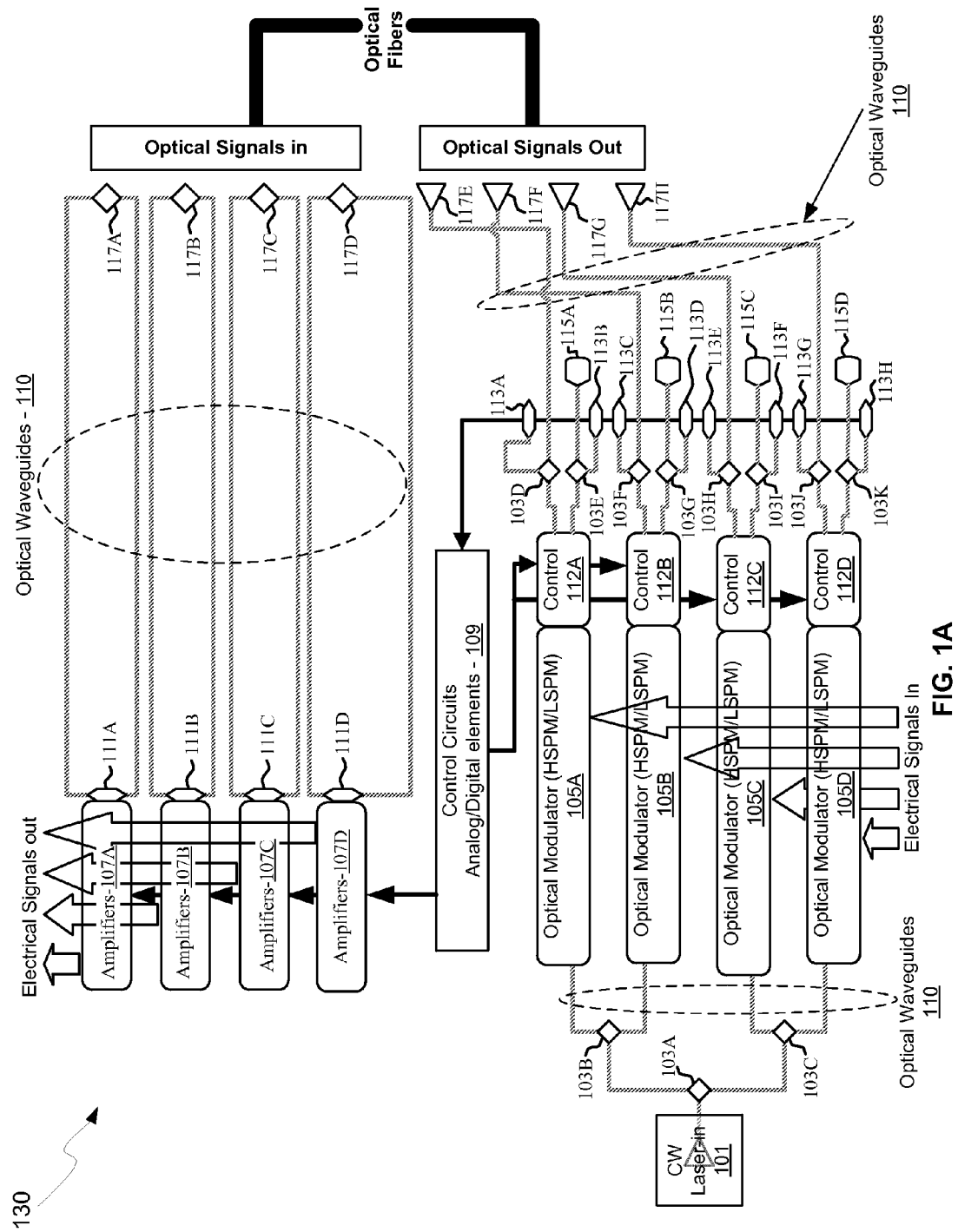
FIG. 1A is a block diagram of a photonically-enabled integrated circuit with optical phase modulators with high modal overlap, in accordance with an example embodiment of the disclosure.

FIG. 1A is a block diagram of a photonically-enabled integrated circuit with optical phase modulators with high modal overlap, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators within for directing one or more CW optical signals to the coupler 103A. The photonically enabled integrated circuit 130 may comprise a single chip, or may be integrated on a plurality of die, such as with one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter, may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction must be carefully optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
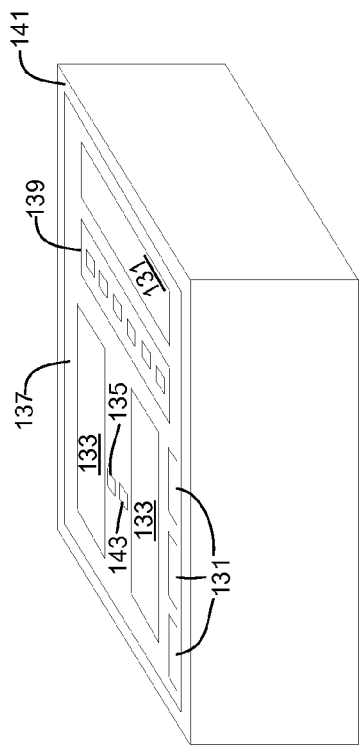
FIG. 1B is a diagram illustrating an exemplary photonically-enabled integrated circuit, in accordance with an example embodiment of the disclosure.

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

In an example scenario, the optical modulators 105A-105D may comprise rib waveguide structures with doping regions of opposite types placed at the four corners of the waveguide rib mimicking a four-petal cloverleaf arrangement. This may result in a structure with a cross-shaped depletion region between the four doping regions, as shown further with respect to FIGS. 3A-4C, and improve the overlap of the optical mode with the depletion region compared to typical linear depletion region structures. Increased modal overlap results in better modulator performance, due to the increased intensity modulation for a given applied bias.

Figure 1C:
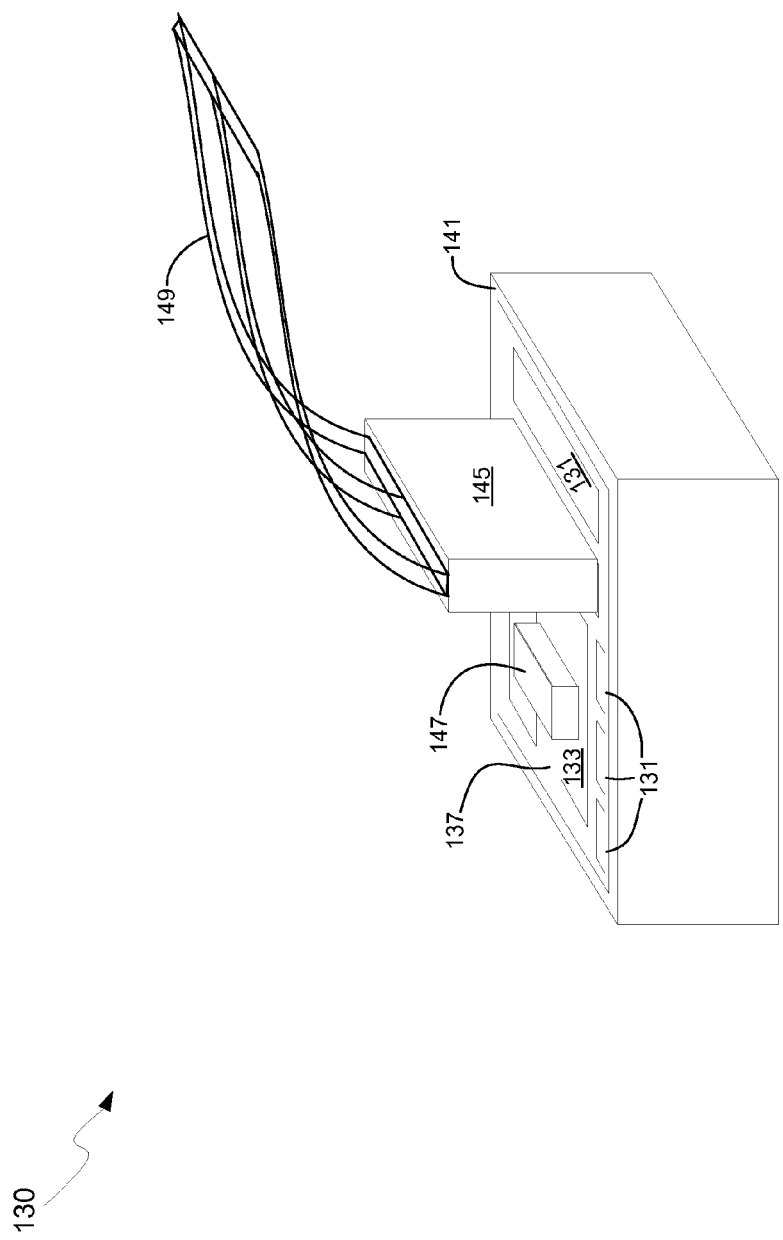
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figures 2A, 2B:
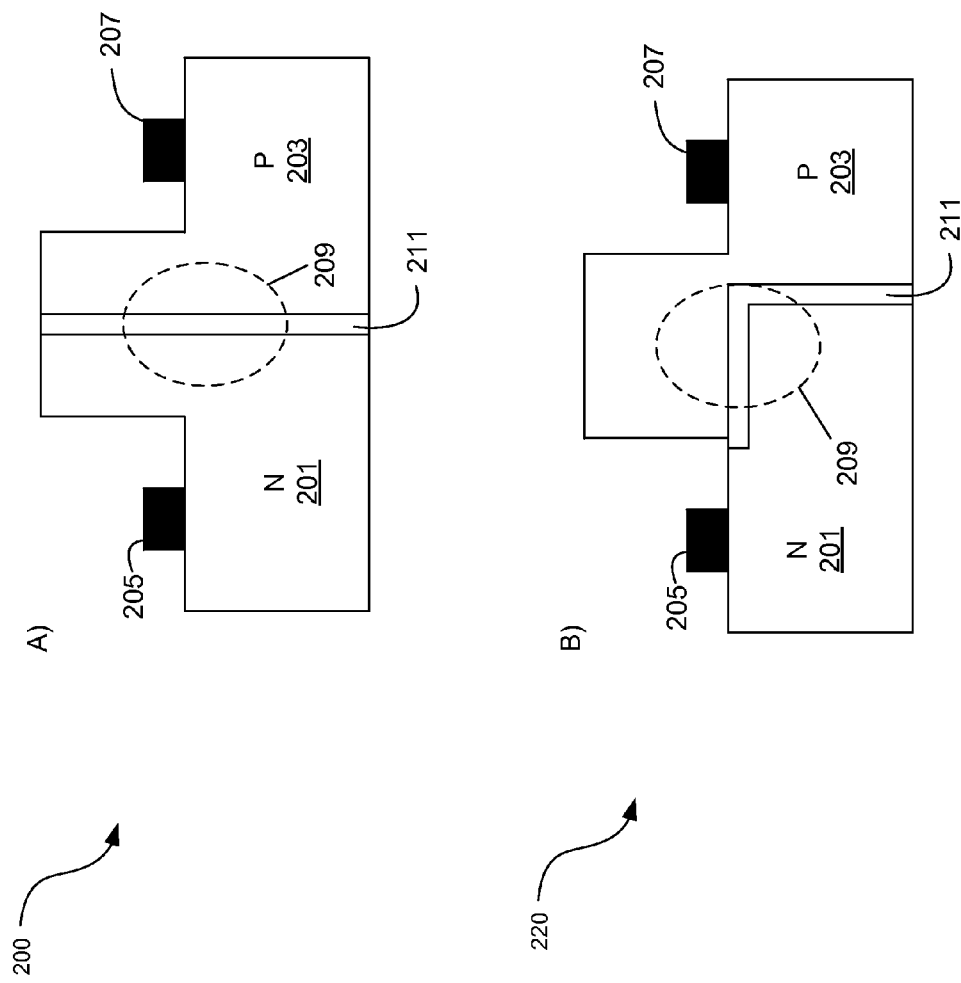
FIGS. 2A-2B illustrate lateral and corner junction modulators, in accordance with an example embodiment of the disclosure.

FIGS. 2A-2B illustrate lateral and corner junction modulators, in accordance with an example embodiment of the disclosure. Referring to FIG. 2A, there is shown a lateral junction modulator 200 comprise an n-region 201, a p-region 203, an anode 205, a cathode 207, an optical mode 209, and a depletion region 211. The lateral junction modulator 200 comprises a rib waveguide, where the upper portion comprises a narrow rib that extends in and out of the plane of the drawing where the optical mode is generally confined, as indicated by the optical mode 209.

The n-region 201 may comprise a silicon material doped n-type and the p-region 203 may comprise a p-doped region of the semiconductor, such that the adjacent regions form a p-n junction. The n-region 201 and the p-region 203 may be formed using ion implantation, for example, into a CMOS wafer comprising the lateral junction modulator 200.

The anode 205 may comprise a low-resistance connection to the n-region 201, and accordingly may comprise a metal or polysilicon for making a good ohmic contact to the n-region 201. Similarly, the cathode 207 may comprise a low-resistance connection to the p-region 203.

FIG. 2B illustrates a corner junction modulator 220 comprising n-region 201, p-region 203, anode 205, cathode 207, optical mode 209, and depletion region 211. While there is also a lateral portion of the junction 211, the region with the most overlap with the optical mode 209 is in the vertical junction section. The various elements of the corner junction modulator 220 may be substantially similar to those described for the lateral junction modulator 210 except that the p-region 203 comprises the entire rib and a portion of the base structure while the n-region 201 comprises the remaining portion of the base of the structure. In this manner, the p-n junction extends laterally between the rib and base portions as well as between the oppositely dope base portions.

As shown in FIGS. 2A and 2B, typical structures use either a lateral or vertical junction layout resulting in sub-optimal overlap. FIGS. 2A and 2B illustrate, schematically, cross-sections of a silicon rib waveguide with a lateral junction, the lateral junction modulator 200, and a vertical p-n junction silicon rib waveguide structure, that is, the corner junction modulator 220.

The depletion region 211 between the n-region 201 and the p-region 209 designates the location of the depletion region during operation. The optical mode 209 in the waveguide rib specifies the region where the optical mode intensity is high. As the voltage across the junction defined by the n-region 201 and the p-region 203 is modulated, the depletion width varies in accordance with the electrical signal. At certain voltages, the depletion width can cover a significant portion of the waveguide.

Figures 3A, 3B, 3C, 3D:
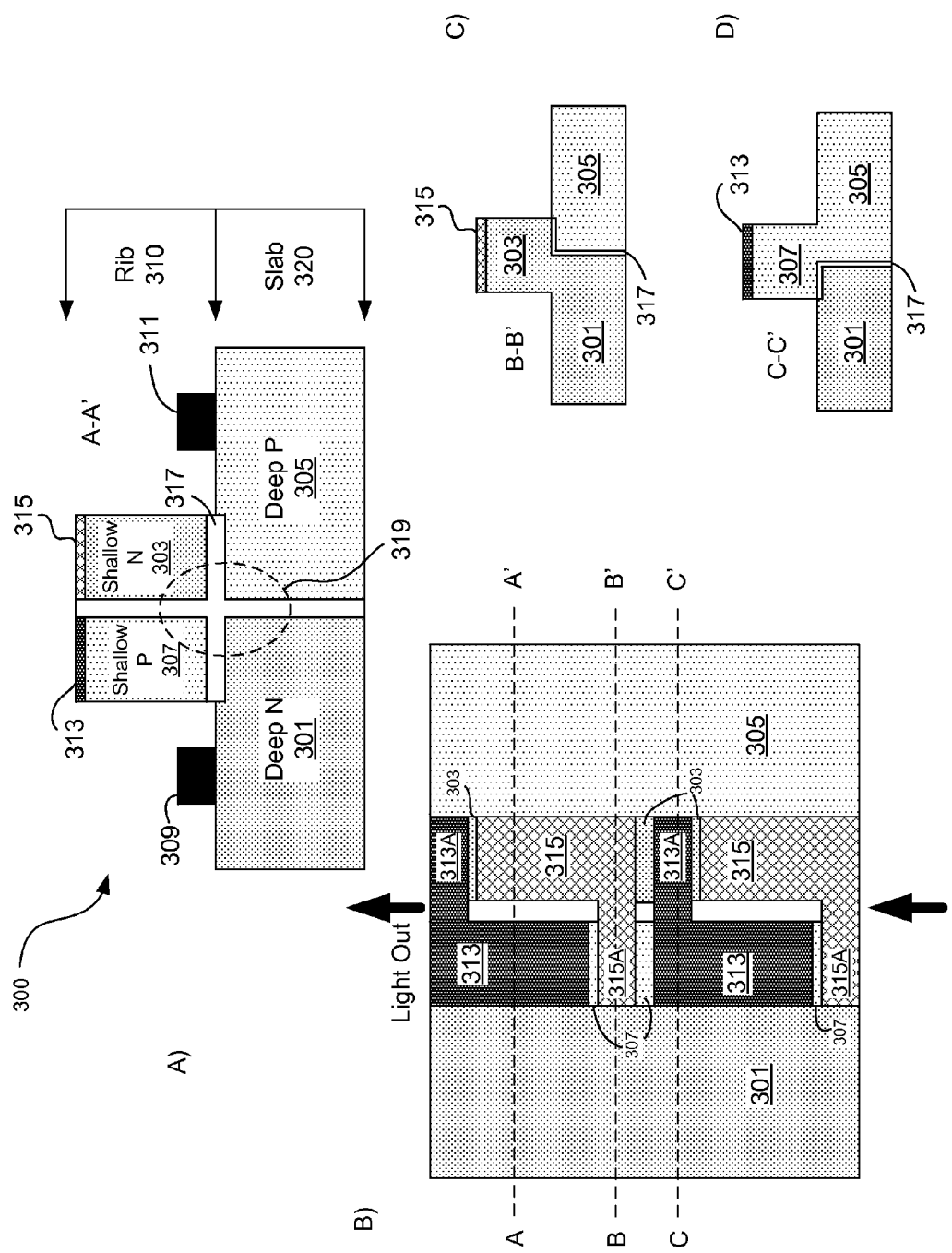
FIGS. 3A-3D illustrate various views of an optical modulator with a cross-shaped depletion region, in accordance with an example embodiment of the disclosure.

FIGS. 3A-3D illustrate various views of an optical modulator with a cross-shaped depletion region, in accordance with an example embodiment of the disclosure. Referring to FIG. 3A, there is shown modulator 300 comprising a deep n-region 301, a shallow n-region 303, a deep p-region 305, a shallow p-region 307, an anode 309, a cathode 311, an ultra-shallow p-region 313, an ultra-shallow n-region 315, a cross-shaped depletion region 317, and an optical mode 319.

The terms "deep," "shallow," and "ultra-shallow" refer to the depth of the dopant into the wafer, such as through an ion implantation process, where the ultra-shallow regions are at the top surface and the deep regions are in the base, or slab 320, of the rib waveguide. The rib 310 is the rib portion of the rib waveguide and comprises the shallow p-region 307, the shallow n-region 303, the ultra-shallow p-region 313, and the ultra-shallow n-region 315. The base, or slab 320, is the bottom portion of the modulator 300 and comprises the deep n-region 301 and the deep p-region 305.

By forming n-regions and p-regions at opposite corners, a cross-shaped depletion region 317 results. This 3D approach to a rib waveguide optical modulator is used to create a cross-shaped junction layout allowing a doubling of the overlap between the optical mode 319 and the depletion region 317.

As illustrated, doping regions of opposite types are placed at the four corners of the waveguide rib mimicking a four-petal cloverleaf arrangement. The junction may be created using two deep implants and two shallow implants as indicated in the figure. This creates two straight depletion regions crossing in the center of the structure, the cross-shaped depletion region 317, which coincides with the peak intensity of the optical mode 319, thus approximately doubling the overlap with respect to a simple lateral or vertical design.

To provide electrical connectivity to the top lobes, the shallow p-region 307 and shallow n-region 303, may be periodically connected along the waveguide to the corresponding doping type regions using straps that can be either L- or T-shaped.

FIG. 3B illustrates a top view of the modulator 300 with L-shaped connectivity of the shallow p- and n-regions. The periodicity of the lateral straps may be configured based on speed requirements: the RC time constant of access resistance and diode capacitance goes up as the length of the straps in the direction of the rib waveguide is increased because of the increased access resistance. The RC time constant trades off with the phase shift per unit length efficiency, because the junction overlap in the strap region is approximately equivalent to a corner junction layout.

FIGS. 3C and 3D show cross-sectional views of the modulator 300 through lines B-B' and C-C', respectively, to illustrate the periodic bridges, or straps 315A, across the rib 310. For example, as shown in FIG. 3B, the ultra-shallow n-region 315 extends along the right side of the modulator 300 on the shallow n-region 303, with periodic bridging, or straps 315A, across the rib 310 to make contact with the deep n-region 301. This is shown in FIG. 3C, which is the cross-section of the modulator 300 along the line B-B' shown in FIG. 3B, where the shallow n-region 303 and the ultra-shallow n-region 315 extend across the width of the rib 310 making contact with the deep n-region 301. It should be noted that while FIG. 3B only shows one full contacting period of the modulator, there can be as many periods as desired along the length of the modulator.

Similarly, the ultra-shallow p-region 313 extends primarily along the left side of the structure on the shallow p-region 307, with periodic bridging, or straps 313A, across the rib 310 laterally to make contact with the deep p-region 305. This is shown in the cross-section view in FIG. 3D, which is the cross-section of the modulator 300 along the line C-C' shown in FIG. 3B, where the shallow p-region 307 and ultra-shallow p-region 313 extend across the width of the rib 310, forming the straps 313A, making contact with the deep p-region 305.

In an example scenario, each of these straps 313A and 315A comprise extensions of the ultra-shallow implants 313A and 313B to improve the access resistance to the junction without introducing high loss in the optical mode. The ultra-shallow implants may have a higher doping density than the shallow implants, but have a poor overlap with the optical mode concentrated near the center of the depletion region 317. Therefore the excess insertion loss caused by the ultra-shallow implants 313 and 315 can be low. However, in some instances, the straps may simply be extensions of the shallow implants 303 and 307 without higher doped ultra-shallow implants.

In operation, an optical signal may be received at one end of the modulator 300, as illustrated by the Light In arrow in FIG. 3B. A modulating voltage may be applied between the anode 309 and cathode 311 to modulate the width of the depletion region 317. Since the width of the depletion region 317 may be modulated in both vertical and lateral directions due to its cross-shape, a larger phase modulation per unit length may result compared to purely lateral and corner junctions as shown in FIGS. 2A and 2B. A modulated optical signal may then be communicated out of the other side of the modulator 300.

Figures 4A, 4B, 4C:
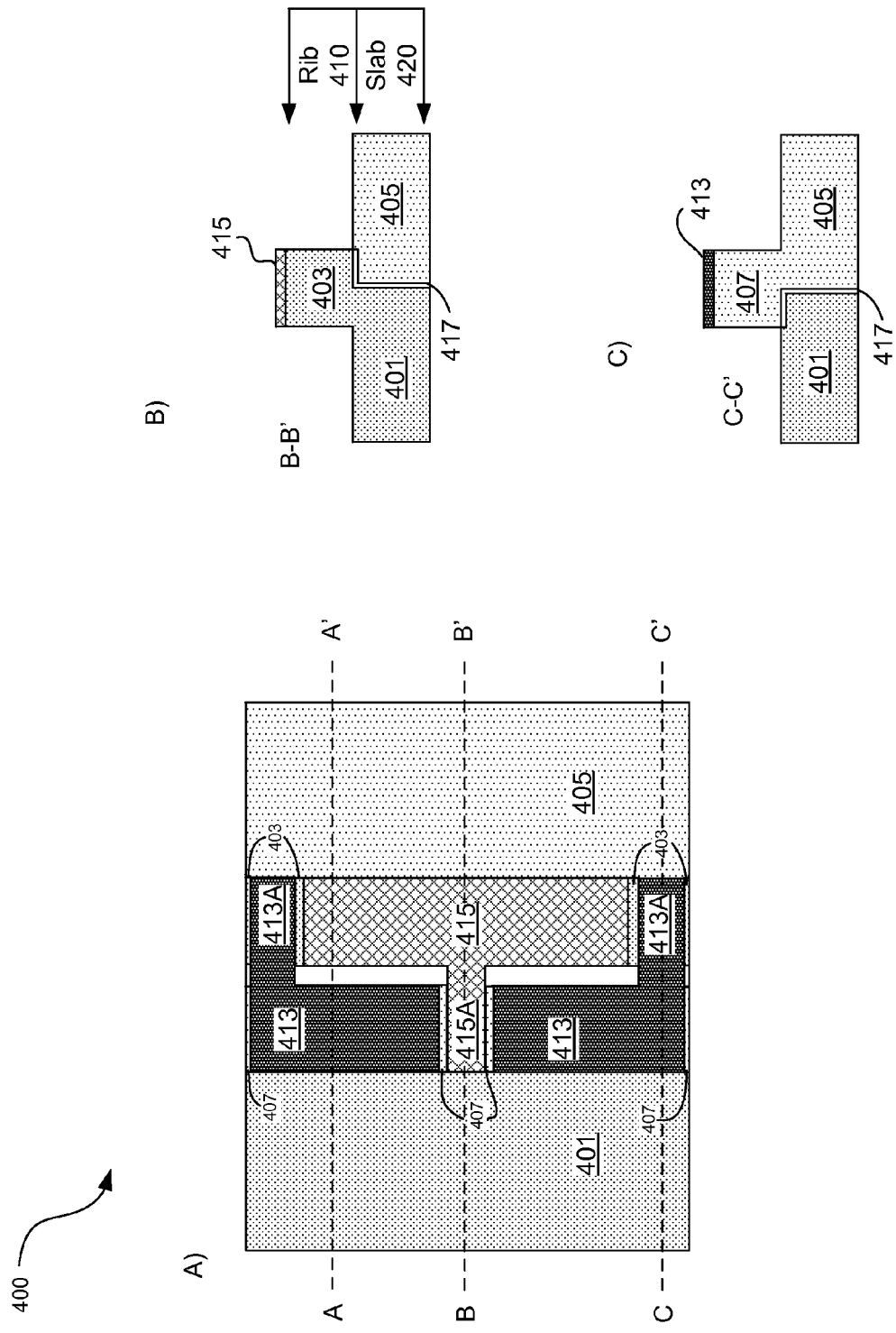
FIGS. 4A-4C illustrate various views of an optical modulator with a cross-shaped depletion region with T-shaped straps, in accordance with an example embodiment of the disclosure.

FIGS. 4A-4C illustrate various views of an optical modulator with a cross-shaped depletion region with T-shaped straps, in accordance with an example embodiment of the disclosure. Referring to FIG. 4A, there is shown a top view of modulator 400 with a cross-shaped depletion regions, similar to the modulator 300 shown in FIGS. 3A-3D, but with T-shaped straps.

FIGS. 4C and 4D show cross-sectional views of the modulator 400 through lines B-B' and C-C', respectively, to illustrate the periodic bridges, or straps 413A and 415A, across the rib 410. For example, as shown in FIG. 4A, the ultra-shallow n-region 415 extends along the right side of the modulator 400 on the shallow n-region 403, with periodic bridging, such as the strap 415A, across the rib 410 to make contact with the deep n-region 401. This is shown in FIG. 4B, which is the cross-section of the modulator 400 along the line B-B' shown in FIG. 4A, where the shallow n-region 403 and the ultra-shallow n-region 415 extend across the width of the rib 410 making contact with the deep n-region 401.

Similarly, the ultra-shallow p-region 413 extends primarily along the left side of the structure on the shallow p-region 407, with periodic bridging, or straps 413A, across the rib 410 laterally to make contact with the deep p-region 405. This is shown in the cross-section view in FIG. 4C, which is the cross-section of the modulator 400 along the line C-C' shown in FIG. 4A, where the shallow p-region 407 and ultra-shallow p-region 413 extend across the width of the rib 410, forming the straps 413A, making contact with the deep p-region 405.

In an example scenario, each of these straps 413A and 415A comprise extensions of the ultra-shallow implants 413A and 413B to improve the access resistance to the junction without introducing high loss in the optical mode. The ultra-shallow implants may have a higher doping density than the shallow implants, but have a poor overlap with the optical mode concentrated near the center of the depletion region 417. Therefore the excess insertion loss caused by the ultra-shallow implants 413 and 415 can be low. However, in some instances, the straps may simply be extensions of the shallow implants 403 and 407 without higher doped ultra-shallow implants.

In an example embodiment, a method and system are disclosed for a silicon-based optical phase modulator with high modal overlap. In this regard, aspects of the disclosure may comprise an optical modulator having a rib waveguide in which a cross-shaped depletion region separates four alternately doped sections. The optical modulator is operable to: receive an optical signal at one end of the optical modulator, modulate the received optical signal by applying a modulating voltage to the optical modulator, and communicate a modulated optical signal out of an opposite end of the optical modulator.

The optical modulator may be in a silicon photonically-enabled integrated circuit in a complementary-metal oxide semiconductor (CMOS) die. An optical mode from the received optical signal is centered on the cross-shaped depletion region. The four alternately doped sections may comprise: a shallow depth p-region, a shallow depth n-region, a deep p-region, and a deep n-region.

The shallow depth p-region may be electrically coupled to the deep p-region periodically along the length of the optical modulator. The shallow depth n-region may be electrically coupled to the deep n-region periodically along the length of the optical modulator. A rib section of the rib waveguide may comprise the shallow depth p-region and the shallow depth n-region. A slab section of the rib waveguide may comprise the deep p-region and the deep n-region. Highly doped layers may be on top of the shallow depth p-region and the shallow depth n-region.

In another example scenario, a method and system are disclosed for a silicon-based optical phase modulator with high modal overlap. In this regard, aspects of the disclosure may comprise a semiconductor die having a rib waveguide optical modulator, the rib waveguide comprising: a slab section with a lower n-region and a lower p-region, a rib section comprising an upper n-region and an upper p-region, the upper n-region above the lower p-region and the upper p-region above the lower n-region, and a cross-shaped depletion region upon which an optical mode is centered, the cross-shaped depletion region formed by the lower n-region, lower p-region, upper n-region, and upper p-region.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for optical communication, the method comprising:
   in an optical modulator having a rib waveguide, the rib waveguide having, in a cross-sectional plane perpendicular to a light path of the rib waveguide, a cross-shaped depletion region and four alternately doped sections separated by the cross-shaped depletion region, wherein the four alternately doped sections comprise: a shallow depth p-region, a shallow depth n-region, a deep p-region, and a deep n-region and wherein the shallow depth p-region is electrically coupled to the deep p-region periodically along a length of the optical modulator where a portion of the shallow depth n-region is removed and the shallow depth p-region extends across a width of the rib waveguide:
   receiving an optical signal at one end of the optical modulator;
   modulating the received optical signal by applying a modulating voltage to the optical modulator; and
   communicating a modulated optical signal out of an opposite end of the optical modulator.

2. The method according to claim 1, wherein the optical modulator is in a silicon photonically-enabled integrated circuit.

3. The method according to claim 2, wherein the silicon photonically-enabled integrated circuit is in a complementary-metal oxide semiconductor (CMOS) die.

4. The method according to claim 1, wherein an optical mode from the received optical signal is centered on the cross-shaped depletion region.

5. The method according to claim 1, wherein the shallow depth n-region is electrically coupled to the deep n-region periodically along the length of the optical modulator where a portion of the shallow depth p-region is removed and the shallow depth n-region extends across the width of the rib waveguide.

6. The method according to claim 1, wherein a rib section of the rib waveguide comprises the shallow depth p-region and the shallow depth n-region.

7. The method according to claim 1, wherein a slab section of the rib waveguide comprises the deep p-region and the deep n-region.

8. The method according to claim 1, wherein highly doped layers are on top of the shallow depth p-region and the shallow depth n-region.

9. A system for communication, the system comprising:
   an optical modulator having a rib waveguide, the rib waveguide having, in a cross-sectional plane perpendicular to a light path of the rib waveguide, a cross-shaped depletion region and four alternately doped sections separated by the cross-shaped depletion region, wherein the four alternately doped sections comprise: a shallow depth p-region, a shallow depth n-region, a deep p-region, and a deep n-region and wherein the shallow depth p-region is electrically coupled to the deep p-region periodically along a length of the optical modulator where a portion of the shallow depth n-region is removed and the shallow depth p-region extends across a width of the rib waveguide, the optical modulator being operable to:
   receive an optical signal at one end of the optical modulator;
   modulate the received optical signal by applying a modulating voltage to the optical modulator; and
   communicate a modulated optical signal out of an opposite and of the optical modulator.

10. The system according to claim 9, wherein the optical modulator is in a silicon photonically-enabled integrated circuit in a complementary-metal oxide semiconductor (CMOS) die.

11. The system according to claim 9, wherein an optical mode from the received optical signal is centered on the cross-shaped depletion region.

12. The system according to claim 9, wherein the shallow depth n-region is electrically coupled to the deep n-region periodically along the length of the optical modulator where a portion of the shallow depth p-region is removed and the shallow depth n-region extends across the width of the rib waveguide.

13. The system according to claim 9, wherein a rib section of the rib waveguide comprises the shallow depth p-region and the shallow depth n-region.

14. The system according to claim 9, wherein a slab section of the rib waveguide comprises the deep p-region and the deep n-region.

15. The system according to claim 9, wherein highly doped layers are on top of the shallow depth p-region and the shallow depth n-region.

16. A system for communication, the system comprising:
a semiconductor die having a rib waveguide optical modulator, the rib waveguide comprising:
a slab section with a lower n-region and a lower p-region;
a rib section comprising an upper n-region and an upper p-region, the upper n-region above the lower p-region and the upper p-region above the lower n-region; and
a cross-shaped depletion region, in a cross-sectional plane perpendicular to a light path of the rib waveguide, upon which an optical mode is centered, the cross-shaped depletion region formed by the lower n-region, the lower p-region, the upper n-region, and the upper p-region, wherein the upper p-region is electrically coupled to the lower p-region periodically along a length of the optical modulator where a portion of the upper n-region is removed and the upper p-region extends across a width of the rib waveguide.

17. A method for optical communication, the method comprising:
in an optical modulator having a rib waveguide, the rib waveguide having, in a cross-sectional plane perpendicular to a light path of the rib waveguide, a cross-shaped depletion region and four alternately doped sections separated by the cross-shaped depletion region wherein the four alternately doped sections comprise: a shallow depth p-region, a shallow depth n-region, a deep p-region, and a deep n-region and wherein the shallow depth n-region is electrically coupled to the deep n-region periodically along a length of the optical modulator where a portion of the shallow depth p-region is removed and the shallow depth n-region extends across a width of the rib waveguide:
receiving an optical signal at one end of the optical modulator;
modulating the received optical signal by applying a modulating voltage to the optical modulator; and
communicating a modulated optical signal out of an opposite end of the optical modulator.

18. The method according to claim 17, wherein the optical modulator is in a silicon photonically-enabled integrated circuit.

19. The method according to claim 18, wherein the silicon photonically-enabled integrated circuit is in a complementary-metal oxide semiconductor (CMOS) die.

20. The method according to claim 17, wherein an optical mode from the received optical signal is centered on the cross-shaped depletion region.

21. The method according to claim 17, wherein a rib section of the rib waveguide comprises the shallow depth p-region and the shallow depth n-region.

22. The method according to claim 17, wherein a slab section of the rib waveguide comprises the deep p-region and the deep n-region.

23. The method according to claim 17, wherein highly doped layers are on top of the shallow depth p-region and the shallow depth n-region.

24. A system for communication, the system comprising:
an optical modulator having a rib waveguide, the rib waveguide having, in a cross-sectional plane perpendicular to a light path of the rib waveguide, a cross-shaped depletion region and four alternately doped sections separated by the cross-shaped depletion region, wherein the four alternately doped sections comprise: a shallow depth p-region, a shallow depth n-region, a deep p-region, and a deep n-region and wherein the shallow depth n-region is electrically coupled to the deep n-region periodically along a length of the optical modulator where a portion of the shallow depth p-region is removed and the shallow depth n-region extends across a width of the rib waveguide, the optical modulator being operable to:
receive an optical signal at one end of the optical modulator;
modulate the received optical signal by applying a modulating voltage to the optical modulator; and
communicate a modulated optical signal out of an opposite end of the optical modulator.

25. The system according to claim 24, wherein the optical modulator is in a silicon photonically-enabled integrated circuit in a complementary-metal oxide semiconductor (CMOS) die.

26. The system according to claim 24, wherein an optical mode from the received optical signal is centered on the cross-shaped depletion region.

27. The system according to claim 24, wherein a rib section of the rib waveguide comprises the shallow depth p-region and the shallow depth n-region.

28. The system according to claim 24, wherein a slab section of the rib waveguide comprises the deep p-region and the deep n-region.

29. The system according to claim 24, wherein highly doped layers are on top of the shallow depth p-region and the shallow depth n-region.

* * * * *